United States Patent [19]
Roither

[11] Patent Number: 5,901,188
[45] Date of Patent: May 4, 1999

[54] METHOD OF AND APPARATUS FOR RDS PHASE SYNCHRONIZATION ON THE RECEIVER SIDE

[75] Inventor: Gerhard Roither, München, Germany

[73] Assignee: SGS-Thomson Microelectronics, GmbH, Grasbrunn, Germany

[21] Appl. No.: 08/569,849

[22] Filed: Dec. 8, 1995

[30]   Foreign Application Priority Data

Dec. 14, 1994 [DE] Germany .............................. 44 44 601

[51] Int. Cl.⁶ .................................................... H04L 7/033
[52] U.S. Cl. .......................... 375/360; 375/361; 375/376; 327/12; 327/159; 327/161
[58] Field of Search ..................................... 375/282, 283, 375/330, 333, 355, 354, 359–361, 371, 379, 373; 341/70, 71; 327/12, 159, 161

[56]   References Cited

U.S. PATENT DOCUMENTS

| | | | |
|---|---|---|---|
| 3,805,180 | 4/1974 | Widmer | 331/1 A |
| 4,222,013 | 9/1980 | Bowers et al. | 331/1 A |
| 4,456,486 | 6/1984 | Evans | 375/360 |
| 5,001,728 | 3/1991 | Füldner | 375/82 |
| 5,301,196 | 4/1994 | Ewen et al. | 370/518 |
| 5,399,987 | 3/1995 | Yamamoto et al. | 329/306 |
| 5,450,450 | 9/1995 | Lee | 375/354 |
| 5,497,126 | 3/1996 | Kosiec et al. | 331/1 A |
| 5,574,756 | 11/1996 | Jeong | 375/376 |

FOREIGN PATENT DOCUMENTS 32 45 438   6/1984   European Pat. Off. .

OTHER PUBLICATIONS

Dietze, Andreas, "SDA 1000 Decodes Radio Data Signals," *Siemens Components*, vol. 25, No. 3, Jul. 1990, pp. 86–91.
*Spezifikation des Radio–Daten–Systems (RDS)*, Deutsche Fassung EN 50067:1992, DIN (German Institute for Standardization), Beuth Verlag GMBH, Berlin, Feb. 1993, pp. 3–5, 14, 62–64.
*Specifications of the Radio Data System RDS for VHF/FM Sound Broadcasting*, Tech. 3244–E, Technical Centre of the European Broadcasting Union, Bruxelles, Belgium, Mar. 1984, pp. 1–12.

*Primary Examiner*—Don N. Vo
*Assistant Examiner*—Amanda T. Le
*Attorney, Agent, or Firm*—David V. Carlson; Robert Mates; Seed and Berry LLP

[57]   ABSTRACT

A method of phase synchronization of a bit rate clock signal generated on a receiver side with a biphase-modulated digital RDS signal that is demodulated on the receiver side with both signals having the same bit rate. The bits of both the RDS signal and the bit rate clock signal are each composed of two half bits having different digital potential values. The first or the second RDS half bit has a high digital value and the other RDS half bit has a low digital value based on which one of two logic values "1" and "0" is represented by the respective RDS bit. At a first time coinciding with the time of a rising and/or falling edge of a bit of the RDS signal, the digital value of the bit rate clock signal is measured as a first sample value, and at a second time shifted from the first time by a delay time that is shorter than a half bit duration, the digital value of the bit rate clock signal is measured as a second sample value. The phase position of the bit rate clock signal is shifted by a positive or a negative phase angle of a phase angle amount based on whether the two sample values each have a different or an identical digital value.

16 Claims, 2 Drawing Sheets

METHOD OF AND APPARATUS FOR RDS PHASE SYNCHRONIZATION ON THE RECEIVER SIDE

TECHNICAL FIELD

The invention relates to phase synchronization of a bit rate clock signal generated on the receiver side with a biphase-modulated, digital RDS signal that is demodulated on the receiver side, with both signals having the same bit rate.

BACKGROUND OF THE INVENTION

In the so-called RDS system (Radio Data System), radio stations broadcast RDS information transmitting station identification, alternative frequencies of the radio station, program types etc. More details in this respect are described in the publication "Specifications of the Radio Data System RDS for VHF/FM Sound Broadcasting", Tech. 3244-E, Technical Centre of the European Broadcasting Union, Brussels, March 1984.

RDS information is transmitted in the form of a signal that is biphase-modulated with a binary bit sequence. With such a biphase-modulated signal, each RDS bit may be divided into two half bits. A phase reversal takes place at the half bit transition between two half bits belonging to one RDS bit. At the bit change between two adjacent RDS bits representing different logic values "0" and "1", a sudden phase change of 180° occurs in the carrier oscillation of the transmitted RDS signal. As a carrier for the RDS signal, a carrier frequency of 57 kHz is employed. This carrier is suppressed on the transmitter side before the radio signal is broadcast. The carrier frequency thus has to be recovered on the receiver side, which is effected with the aid of a quartz oscillator on the receiver side. The RDS information is broadcast on the transmitter side with a bit rate of 1187.5 Hz. In order to be able to demodulate the received RDS signal on the receiver side, a bit rate clock signal with the same rectangular frequency has to be generated on the receiver side. This is effected by dividing the frequency of the 57 kHz oscillator signal produced on the receiver side by the value 48.

In order to allow proper decoding of the digital RDS signal demodulated on the receiver side, the bit rate clock signal generated on the receiver side must be in phase synchronism with the demodulated digital RDS signal. This is effected conventionally with a so-called "Costas loop" providing edge coincidence of the digital RDS signal demodulated on the receiver side and the bit rate clock signal generated on the receiver side, irrespective of whether RDS signal edges and bit rate clock signal edges having the same direction or opposite directions with respect to time are brought into coincidence.

An ordinary PLL uses for each bit period a sample value of a signal in order to synchronize it in terms of phase with another signal. In case of the Costas loop, a sample pair of two samples shifted by 90° from each other is used for each bit period. In the Costas loop, for example, at the time of the rising edge, a first sample value is taken of the digital RDS signal demodulated on the receiver side, and at a later time corresponding to a phase angle of 90° a second sample value of the digital RDS signal is taken. When the two samples belonging to a respective sample pair have different digital values of the RDS signal, it is assumed that the bit rate clock signal is in phase lead with respect to the digital RDS signal. When the two samples of the RDS signal belonging to a sample pair, in contrast thereto, have the same digital values, it is assumed that the bit rate clock signal generated on the receiver side is phase lagging with respect to the RDS signal. This difference in the sample values of the respectively associated sample pairs is used for establishing phase synchronism between the edges of RDS signal and bit rate clock signal. When the sample values of the respectively associated sample pairs have different digital values, the bit rate clock signal is shifted by a positive phase angle of predetermined phase angle amount. If however the two samples of the sample pairs have the same digital values, the bit rate clock signal is shifted by a negative phase angle of the predetermined phase angle amount.

The problem recognized by applicants is that these assumptions do not always hold true. For example, with this known phase synchronization method, in case the bit rate clock signal produced on the receiver side is in phase lead with respect to the demodulated digital RDS signal, sample pairs having the same digital values are obtained when two adjacent RDS bits meet each other which represent different logic values "0" and "1", respectively. At these locations, the phase synchronization circuit erroneously assumes that the bit rate clock signal is phase lagging with respect to the RDS signal. Thus, in case of such logic value changes between adjacent RDS bits, an erroneous regulating operation takes place in the phase synchronization circuit.

SUMMARY OF THE INVENTION

It is an object of the invention to provide a method of and an apparatus for phase synchronization in which such synchronization errors are avoided.

In the conventional phase synchronization method, samples are taken from the digital RDS signal demodulated on the receiver side and the sampling times are determined by the edges of the bit rate clock signal generated on the receiver side. According to the present invention, however, samples are taken from the bit rate clock signal, with the sampling times being determined by the edges of the demodulated digital RDS signal. The result is that, in case of a phase lead of the bit rate clock signal with respect to the RDS signal, the sample values of all sample pairs have the same digital values, also at such locations where two RDS bits with different logic values meet. In case of a phase lag of the bit rate clock signal with respect to the RDS signal, the two sample values of all sample pairs have different digital values. At those locations where two RDS bits with different logic values are adjacent each other, no edge transition takes place in the RDS signal and, thus, no samples of the bit rate clock signal are taken at these locations. Thus, in the phase synchronization method according to the invention, irrespective of whether RDS bits with the same logic values or with different logic values are adjacent each other, always that pair of digital values of the respective two sample values occurs for all sample pairs which is appropriate for the phase lead or the phase lag of the bit rate clock signal. Thus, in the phase synchronization method according to the invention, errors in regulating the phase position do not occur even at those locations where RDS bits with different logic values are adjacent each other.

The two sample values of each sample pair preferably are subjected to a comparison of their digital values such that a first comparison result signal is generated when the digital values are alike and a second comparison result signal is generated when the digital values are different. The two comparison result signals are integrated, with one of the two comparison result signals leading to an increase and the other comparison result signal leading to a decrease of the integration value. Upon reaching an upper integration value limit in a first direction and upon reaching of a lower integration value limit in the opposite direction, the bit rate clock signal is shifted by the phase angle of predetermined phase angle amount in the one direction or the other direction, respectively.

In this manner, regulative acting upon the relative phase position between RDS signal and bit rate clock signal takes place always only in that case when phase lead or a phase lag, respectively, of the bit rate clock signal with respect to the RDS signal has been ascertained for a predetermined period of time.

In a particularly preferred embodiment, a selection can be made among a redetermined number of different integration value limits through which, when reached, a phase shift is caused. The selection can be made such that in case of switching over of the RDS receiver to a transmitter receiving frequency different from that received so far, lower integration limit values are selected, and upon expiration of a predetermined period of time after such switching over or upon determination of latching of the receiver to the other transmitter receiving frequency, higher integration value limits are selected.

This provides the advantage that, after frequency changing of the receiver, a rapid regulating operation takes place and that after latching of the receiver to the other transmitter receiving frequency, a gentler regulating operation takes place in which interferences can make themselves felt less.

A preferred embodiment of a phase synchronization apparatus according to the invention comprises an oscillator on the receiver side and a programmable frequency divider by means of which the output frequency of the receiver side oscillator (having a frequency of 57 kHz) can be divided down to the frequency of the bit rate clock signal (1187.5 Hz) and whose output delivers the bit rate clock signal. With the aid of an edge detector, a first sampling or detection control signal is issued upon occurrence of the rising and/or falling edges of the RDS signal. With the aid of a delay circuit, a second detection control signal is generated upon expiration of a predetermined delay time, which preferably corresponds to a phase angle of 90°. At the time of occurrence of the first and second detection control signals, respectively, the respective digital values of the bit rate clock signals delivered by the programmable frequency divider are read into a temporary storage circuit. Connected to the output thereof is a comparator circuit which, depending on whether the two respective digital values stored in the temporary storage circuit are equal or different, issues at an output thereof an equality signal or an inequality signal. Connected to the output of the comparator circuit is a digital integrator adapted to integrate the signals supplied from the output of the comparator circuit. Upon reaching a predetermined upper integration limit value, a first integrator output signal is issued, and upon reaching a predetermined lower integration value limit, a second integrator output signal is issued. The programmable frequency divider has a control input which is connected to the integrator output and via which the respective count value can be altered by a predetermined count value amount in one counting direction upon receipt of the first integrator output signal and in the other counting direction upon receipt of the second integrator output signal. As a result thereof, upon reaching the upper or the lower integration value limit, respectively, a next rising or falling edge of the bit rate clock signal is delivered at the output of the frequency divider at an earlier or later time, respectively, as compared with a case in which the frequency divider did not receive an integrator output signal from the integrator.

BRIEF DESCRIPTION OF THE DRAWINGS

The invention will now be described in more detail with reference to embodiments shown in the accompanying drawings, in which.

DETAILED DESCRIPTION OF THE INVENTION

Figure 1A:
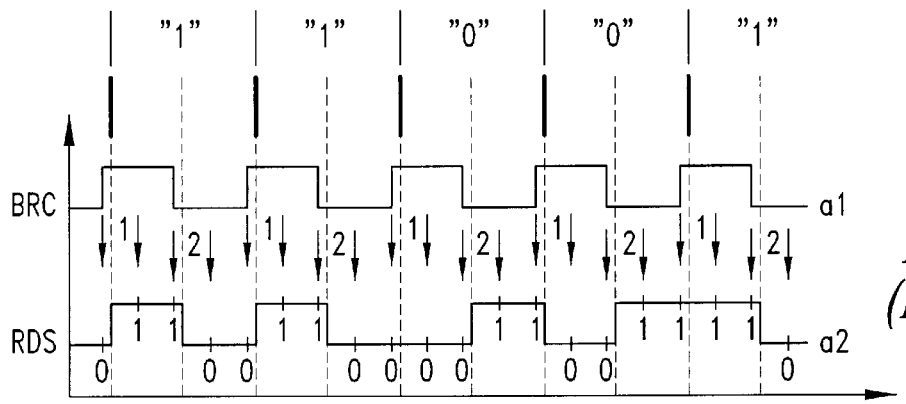
FIG. 1a and FIG. 1b show signal curves serving to elucidate a conventional phase synchronization method.
Figure 1B:
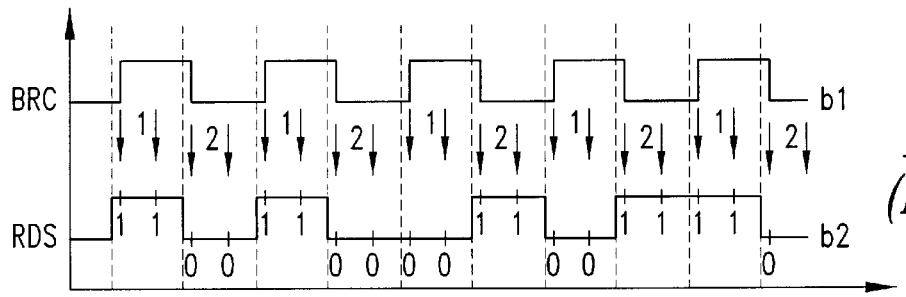
Figure 1C:
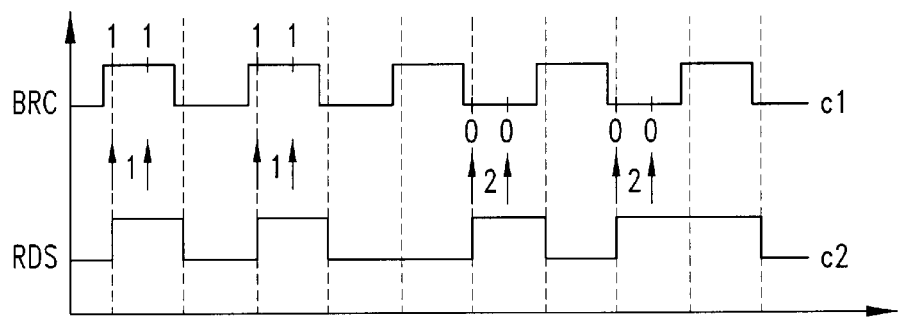
FIG. 1c show FIG. 1d show signal curves serving to elucidate a phase synchronization method according to the invention.
Figure 1D:
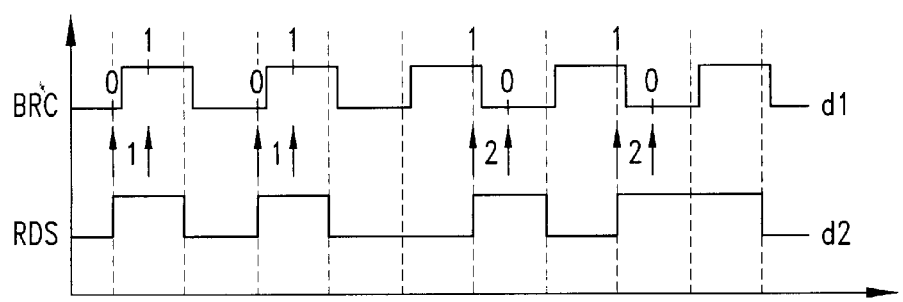

FIG. 1 illustrates four signal curve pairs a, b, c, and d. Curves a2, b2, c2, and d2 thereof each show the same RDS signal curve. Curves a1, b1, c1, and d1 show signal curves of the bit rate clock signal BRC. In signal curves a1 and c1, the bit rate clock signal BRC is leading with respect to the RDS signal. In signal curves b1 and d1, the bit rate clock signal BRC is lagging with respect to the RDS signal.

Above signal curve a1, RDS bit limits are marked by thick vertical lines. Thin vertical lines located therebetween mark the half bit change for each RDS bit. Above these vertical lines, the logic values of the individual RDS bits are indicated. The RDS signal depicted in FIG. 1 thus represents the logic value sequence 11001. In compliance with the RDS standard, the first half bits of the RDS bits having a logic value "1" have a positive phase sign and the second half bits have a negative phase sign. In contrast thereto, the RDS bits with the logic value "0" have a negative phase sign in the first half bit and a positive phase sign in the second half bit. The result is that no phase sign change, and thus no edge transition, occurs at the bit limits between RDS bits with different logic values.

Between the signal curves of each signal curve pair, there are indicated arrows each marked in pairs with a numeral 1 or numeral 2. In case of arrow pairs numbered 1, the first arrow occurs at the time of a rising signal edge. In case of arrow pairs numbered 2, the first arrow occurs at the time of a falling signal edge. At each time marked by an arrow, which is determined by an edge of the one signal of the signal curve pair belonging together, a sample value is taken from the other signal of the respective signal curve pair. When the arrows are directed downwardly, samples of the RDS signal are taken in accordance with the occurrence of edges of the bit rate clock signal BRC. When the arrows are directed upwardly, samples of the bit rate clock signal BRC are taken in accordance with edges of the RDS signal.

The first arrow of each arrow pair marks the time of an edge of the bit rate clock signal and the RDS signal, respectively. The second arrow of each arrow pair marks a time which is delayed by a time corresponding to a phase angle of 90° with respect to the edge of the bit rate clock signal or RDS signal, respectively, marked by the first arrow.

The signal curve pairs a and b of FIG. 1 illustrate the conventional phase synchronization method.

At each edge of the bit rate clock signal BRC in signal curve lines a1 and b1, a sample value is taken from the RDS signal in signal curve lines a2 and b2, respectively. After a time delay corresponding to a phase angle of 90°, a second sample value of the RDS signal is taken. These two sample values together constitute a sample value pair. Each of the arrow pairs designated 1 and 2 includes one sample value pair. In signal curve line a2, the two sample values of each sample value pair have different digital values. An exception in this respect are sample value pairs taken at those bit change locations where the logic value of the RDS signal changes. At those locations, both sample value pairs either have the signal value 0 or the signal value 1.

Except for the locations where RDS bits with different logic values are adjacent each other, the two sample values of each sample value pair thus have different signal values in signal curve pair a when the bit rate clock signal is leading with respect to the RDS signal.

In case of signal curve pair b, i.e., when the bit rate clock signal is lagging with respect to the RDS signal, the sample values of each sample value pair have the same signal values. Both sample pairs either have a high signal value ("1") or a low signal value ("0").

The conventional phase synchronization method is based on the assumption that, upon occurrence of sample value pairs having different signal values, the bit rate clock signal is leading with respect to the RDS signal and that, upon occurrence of sample value pairs having the same sample values, the bit rate clock signal is lagging with respect to the bit rate clock signal. However, due to the fact that, in cases where RDS bits with different logic values are adjacent each other, sample pairs with identical sample pair values occur even when the bit rate clock signal is leading with respect to the RDS signal, misinterpretations take place at these locations for a bit rate clock signal that is leading with respect to the RDS signal, with these misinterpretations in turn resulting in regulation errors during phase synchronization regulation.

When looking at the phase synchronization method according to the invention by way of signal curve pairs c and d, it is recognizable that this problem has been overcome with the present invention.

As described above, the invention proceeds such that on the one hand not the edges of the bit rate clock signal determine the sampling times, but the edges of the RDS signal, and that on the other hand samples are not taken of the RDS signal, but of the bit rate clock signal.

For ease of illustration, not all arrow pairs, upon occurrence of which sample value pairs are taken, are shown for signal curve pairs c and d.

When looking at signal curve pair c, all arrow pairs 1 and 2 indicating sampling times include sample value pairs each containing two sample values of the bit rate clock signal with the same signal value. This applies irrespective of whether two adjacent RDS bits have the same or different logic values. This means that in the event that the bit rate clock signal is leading with respect to the RDS signal, the two sample values of all signal value pairs have the same signal value.

When looking at signal curve pair d, the two sample values of each sample value pair have different signal values of the bit rate clock signal. And this holds again without exception for all sample value pairs.

Consequently, in the phase synchronization method according to the invention, the comparison result as to whether the two sample values of a sample value pair have the same signal value or a different signal value of the bit rate clock signal, at all locations of the signal curve provide reliable information as to whether the bit rate clock signal is leading or lagging with respect to the RDS signal. When the comparison result, whether the two sample values of sample value pairs belonging together have a different or the same signal value, is used for influencing the phase position of the bit rate clock signal in such a manner that the latter is shifted by a positive phase angle upon occurrence of sample value pairs having sample values of the same signal value and by a negative phase angle upon occurrence of sample value pairs having sample values of different signal values, the regulation errors as in the conventional phase synchronization method are not present here.

Figure 2:
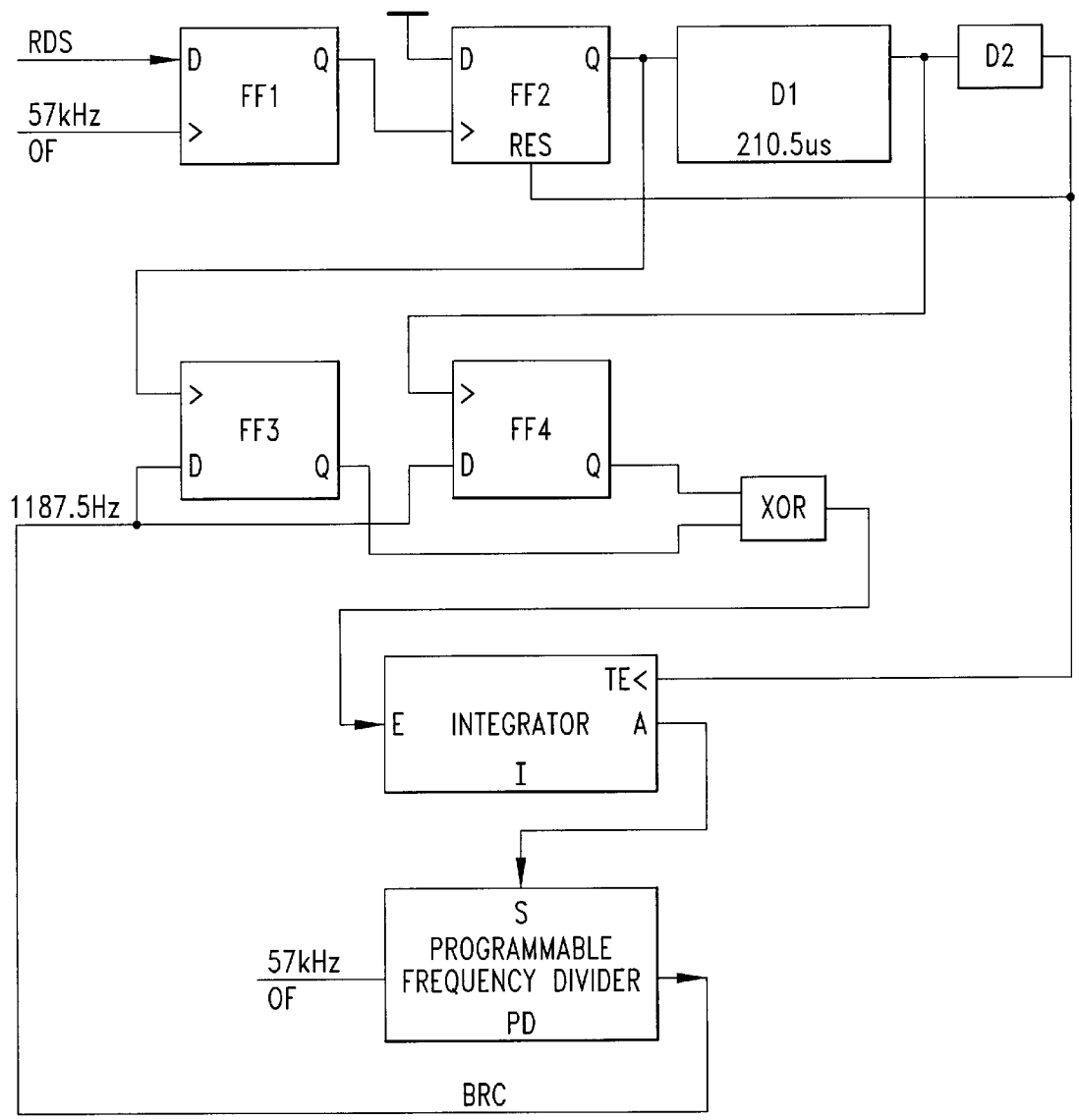
FIG. 2 shows a block diagram of an embodiment of a phase synchronization apparatus according to the invention.

The phase synchronization method according to the invention can be performed by a phase synchronization circuit according to FIG. 2, which will now be described in more detail.

This phase synchronization circuit contains four D-type flip-flops FF1 to FF4, two delay members D1 and D2, an integrator I, and a programmable frequency divider PD. The D-type input of FF1 is fed with the digital RDS signal demodulated on the receiver side. An oscillator frequency of 57 kHz is present at the clock input of FF1. The Q output of FF1 is connected to a clock input of FF2. The D-type input of the latter is permanently connected to a supply voltage, i.e., a logic high signal value. The Q output of FF2 on the one hand has the input of a first delay member D1 connected thereto and on the other hand has the clock input of FF3 connected thereto. The output of the first delay member D1 is connected on the one hand to the input of a second delay member D2 and on the other hand to the clock input of FF4. The D-type inputs of FF3 and FF4 are each fed with the bit rate clock signal BRC delivered from the output of the programmable frequency divider PD and having a bit rate of 1187.5 Hz. The Q outputs of FF3 and FF4 are each connected to an input of a comparator circuit in the form of a XOR logic circuit. The output thereof is connected to an input of integrator I. The output of the second delay member D2 is connected on the one hand to a resetting input RES of FF2 and on the other hand to a clock input TE of integrator I. The output of integrator I is connected to a control terminal S of the programmable frequency divider PD. In one embodiment, the programmable frequency divider PD is a counter that generates a clock signal on its output that is divided down from the input frequency. The respective count thereof can be altered by a predetermined count value amount by a control signal supplied to control input S. In doing so, an alteration is caused in the normal counting operation by means of which the oscillator frequency of 57 kHz fed to the input side of the programmable frequency divider PD is divided down to the desired bit rate of the bit rate clock signal.

Flip-flop FF1 constitutes a synchronization stage by means of which the edge of the digital RDS signal demodulated on the receiver side is synchronized with the edge of the 57 kHz oscillator frequency in order to synchronize the RDS signal with the internal system of the RDS receiver. A specific edge change in the RDS signal applied to the D-type input appears at the Q output of FF1 only upon occurrence of the next associated edge of the oscillator frequency OF.

Flip-flop FF2 constitutes an edge detector issuing a first detection control signal upon occurrence, e.g., of the rising edges of the RDS signal. When this detection control signal reaches the clock input of FF3, the signal value of the bit rate clock signal present at that time at the D-type input of FF3 is connected through to the Q output of FF3 and from there is passed to an input of the XOR logic circuit. The first detection control signal appearing at the Q output of FF2 is delayed by the first delay member D1 by a duration of 210.5 $\mu$s, which represents a phase angle of 90° of the RDS signal. The signal appearing after this delay time at the output of delay member D1 constitutes a second detection control signal. When the latter reaches the clock input of FF4, the signal value of the bit rate clock signal present at that time at the D-type input of FF4 is connected through to the Q output of FF4 and from there is passed to the other input of XOR. Flip-flops FF3 and FF4 together constitute a temporary storage circuit in which signal values of the bit rate clock signal respectively occurring at both detection or sampling times are stored temporarily and are held available for a comparison with the aid of the XOR logic member.

Depending on whether the two sample values of the respective sample value pair measured have the same or different signal values, an equality signal in the form of a logic value "0" or, respectively, an inequality signal in the form of a logic value "1" appears at the output of XOR. These logic values are fed to the input E of integrator I. This integrator I is in the form of an upward/downward counter, and at the time at which a counting clock is fed to its clock input TE from the output of second delay member D2, said upward/downward counter increases or decreases its count value depending on whether the equality signal or the inequality signal is present at counter input E at the time of occurrence of the respective counting clock.

The output signal of the second delay member D2 furthermore causes resetting of FF2.

When the counter acting as integrator I has reached a specific upper count value limit or a specific lower count value limit, a control signal is supplied via output A of integrator I to control input S of the programmable frequency divider PD that is constituted by a counter. Depending on whether the counter serving as integrator I has reached the upper or the lower count value limit, the counter of programmable frequency divider PD is decreased or increased by a predetermined count value amount. This count value alteration of the programmable frequency divider has the effect that the next edge of the bit rate clock signal takes place at an earlier or at a later time as compared to a case in which no influencing of the programmable frequency divider PD via its control input S takes place. This has the effect of a phase shift of the bit rate clock signal by a positive or a negative phase angle amount.

The effect achieved by interposing integrator I between the output of the XOR logic member and the control input S of the programmable frequency divider PD, is that an influence on the counting operation of the programmable frequency divider PD and thus a phase shift of the bit rate clock signal BRC takes place only when phase lead or phase lagging, respectively, of the bit rate clock signal with respect to the RDS signal has been ascertained over a specific number of half bits. Minor noise or interference signals typically affect only individual half bits on an irregular or sporadic basis and, thus, do not have an effect on the phase synchronization regulation circuit of this invention.

In one embodiment, a selection is possible among various extreme count values of the counter acting as integrator I, at which a control signal is supplied to control input S of programmable frequency divider PD. For example, it is possible to perform programming such that the selection of the maximum count value and the selection of the minimum count value, at which it is acted upon the counting operation of programmable frequency divider PD, are controllable in accordance with the process that, upon turning on of the RDS receiver or switching over of the same to a different transmitter receiving frequency than that received so far, switching over is possible to a maximum or minimum count value, respectively, having a lesser distance to an average count value, and after expiration of a predetermined time period after such turning on or switching over or upon determination of latching of the receiver to the new transmitter receiving frequency, switching over is possible to a maximum count value or minimum count value, respectively, having a larger distance to an average count value. This provides the advantage that immediately after such turning on or switching over, i.e., at a time when the bit PLL of the RDS receiver is normally still far away from phase synchronization of RDS signal and bit rate clock signal, the counting operation of programmable frequency divider PD is acted upon more frequently per unit of time and the desired phase synchronization thus is obtained faster than in case of the use of extreme count values having a larger distance from the average count value. When latching to the transmitter frequency then has been successfully obtained and phase synchronization is present, it is only necessary to correct moving apart of the phases of RDS signal and bit rate clock signal, for which the counting operation of the programmable frequency divider PD needs to be acted upon less frequently. Even relatively frequently occurring interferences then cannot render the phase regulating operation erroneous.

In an alternative embodiment, it is acceptable to have fixed maximum and minimum count values in the integrator I such that the phase of the bit rate clock signal is changed upon receiving a predetermined number of phase synchronization errors in either direction.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. In a data receiver circuit adapted to receive a data signal containing bits of data and to generate a clock signal to read the bits of data from the data signal, each bit of the data signal and the clock signal including two half bits, a circuit for determining a phase position of the clock signal relative to the data signal, the circuit comprising:

an edge detector adapted to receive the data signal for generating at its output a first detection signal upon a detection of a transition edge of the data signal;

a delay circuit connected to the edge detector for generating at its output a second detection signal after a predetermined amount of time that is shorter than a duration of the half bit;

a first memory circuit having an input connected to the edge detector for storing a logic value of the clock signal upon the occurrence of the first detection signal;

a second memory circuit having an input connected to the delay circuit for storing a logic value of the clock signal upon the occurrence of the second detection signal; and a comparator connected to the first and second memory circuits for comparing the two stored logic values to determine whether the clock signal leads or lags the data signal.

2. The circuit according to claim 1 wherein the comparator generates at an output a first comparison signal when the two stored logic values are equal and a second comparison signal when the two stored logic values are unequal, further comprising:

a digital integrator having an input connected to the comparator for integrating the comparison signals into an integration value over a predetermined number of transition edges of the data signal and Generating at an output a first integrator signal when the integration value reaches an upper integration value limit and a second integrator signal when the integration value reaches a lower integration value limit;

an oscillator generating an oscillating signal having a frequency; and a frequency divider connected to the oscillator for dividing down the frequency of the oscillating signal to a frequency of the clock signal, the frequency divider having a control input connected to the digital integrator for changing a count value by a predetermined amount in a first count direction or a second count direction upon a receipt of the first or second integrator signal, respectively.

3. The circuit according to claim 2 wherein the digital integrator includes an up/down counter.

4. The circuit according to claim 1, further comprising:

an oscillator generating, an oscillating signal; and an edge synchronization circuit having, a first input for receiving the data signal, a second input connected to the oscillator, and an output connected to an input of the edge detector, the edge synchronization circuit being structured to generate at its output the data signal having a transition edge in synchronization with a transition edge of the oscillating signal.

5. In a radio equipped to receive a biphase-modulated radio data signal containing bits of data and having a predetermined bit rate wherein the radio generates a clock signal for reading the bits of data contained in the data signal, the clock signal having bits and a bit rate substantially equal to the predetermined bit rate of the data signal, each bit of the data signal and the clock signal including two half bits, a circuit for determining a phase position of the clock signal relative to the data signal, the circuit comprising:

an edge detector having an input for receiving the data signal and generating at an output a first detection signal upon a detection of a transition edge of the data signal;

a delay circuit connected to the edge detector for generating at its output a second detection signal after a predetermined amount of time from the generation of the first detection signal, the predetermined amount of time being shorter than a duration of a half bit;

a first memory circuit having an input connected to the edge detector for storing a logic value of the clock signal upon the occurrence of the first detection signal;

a second memory circuit having an input connected to the delay circuit for storing a logic value of the clock signal upon the occurrence of the second detection signal; and a comparator connected to the first and second memory circuits for comparing the two stored logic values to determine whether the clock signal leads or lags the data signal.

6. A method of phase synchronization of a bit rate clock signal having a plurality of bits and a phase position generated on a receiver side with a biphase-modulated, digital RDS signal having a plurality of bits that is demodulated on the receiver side, with both signals having the same bit rate, wherein the bits of the RDS signal and the bit rate clock signal are each composed of first and second half bits having different digital potential values and, depending on which one of two logic values "1" and "0" is represented by a respective RDS bit, the first or the second half bit of the respective RDS bit has a high digital value and the respective other half bit of the respective RDS bit has a low digital value, comprising:

at a respective first time coinciding with a rising and/or a falling edge of a respective bit of the RDS signal, measuring a digital value of the bit rate clock signal as a first sample value, and at a second time shifted from the respective first time by a predetermined delay time that is shorter than a half bit duration, measuring a digital value of the bit rate clock signal as a second sample value;

depending on whether the two sample values each have a different or an identical digital value, shifting the phase position of the bit rate clock signal by a positive or a negative phase angle of a predetermined phase angle amount;

comparing the two respectively associated sample values according to their digital values, producing a first comparison result signal when the digital values of the two sample values are identical, and producing a second comparison result signal when the two digital values of the two sample values are different;

integrating the comparison result signals to generate an integration value such that one of the two comparison result signals leads to an increase of the integration value and the other comparison result signal leads to a decrease of the integration value, and shifting the bit rate clock signals upon reaching an upper limit of the integration value in a first direction or upon reaching a lower limit of the integration value in an opposite direction, by said phase angle of the predetermined phase angle amount;

selecting the upper limit and the lower limit from among various integration value limits; and selecting low upper and lower limits of the integration value upon a switching over to a new transmitter receiving frequency, and selecting higher upper and lower limits of the integration value upon an expiration of a predetermined period of time after such switching over or upon a determination of a latching of the receiver side to the new transmitter receiving frequency.

7. A method according to plain 6, further comprising the step of selecting the predetermined delay time corresponding to a phase angle of 90°.

8. An apparatus for phase synchronization of a biphase-modulated, digital RDS signal having a plurality of bits and being demodulated in a radio receiver with a bit rate clock signal generated on a receiver side and having a phase position and a plurality of bits with the same bit rate as the RDS signal, the bits of the RDS signal and the bit rate clock signal each being composed of first and second half bits having different digital potential values, and, depending on which one of two logic values "1" and "0" is represented by a respective RDS bit, the first or the second half bit of the respective RDS bit has a high digital value and the respective other half bit of the respective RDS bit has a low digital value, the apparatus comprising:

an oscillator on the receiver side structured to generate an output frequency and a programmable frequency divider wherein the output frequency of said oscillator is divided down to a frequency of the bit rate clock signal, the programmable frequency divider being structured to generate the bit rate clock signal at an output;

an edge detector being structured to issue a first detection control signal upon an occurrence of a rising and/or a falling edge of the RDS signal;

a delay circuit being structured to issue a second detection control signal upon an expiration of a predetermined delay time as of an occurrence of the first detection control signal;

a temporary storage circuit adapted to have read therein to two respective digital values of the bit rate clock signal supplied by the programmable frequency divider, which are present at the times of an occurrence of the first and the second detection control signals, respectively;

an output of the temporary storage circuit having a comparator circuit connected thereto which, depending on whether the two digital values respectively stored in said temporary storage circuit are equal or unequal, delivers an equality signal or an inequality signal at an output;

a digital integrator coupled on an input side to the output of the comparator circuit and through which the signals delivered from the output of the comparator circuit can be integrated to generate an integration value, the digital integrator being structured to issue at an integrator output a first integrator output signal when the integration value reaches a predetermined upper integration value limit, and a second integrator output signal when the integration value reaches a predetermined lower integration value limit;

wherein the programmable frequency divider has a control input coupled to the integrator output, the programmable frequency divider having a respective count value which may be altered by a predetermined count value amount in one counting direction upon a receipt of the first integrator output signal and in another counting direction upon a receipt of the second integrator output signal; and wherein at a first time coinciding with a rising and/or a falling edge of a bit of the RDS signal, the digital value of the bit rate clock signal is measured as a first sample value, and at a second time shifted from the first time by a delay time that is shorter than a duration of a half bit, the digital value of the bit rate clock signal is measured as a second sample value, and the phase position of the bit rate clock signal is shifted by a positive or a negative phase angle of a phase angle amount based on whether the first and second sample values have a different or an identical digital value.

9. An apparatus according to claim 8, further comprising:

a synchronization stage coupled upstream of the edge detector, the synchronization stage being adapted to synchronize a rising and/or a falling edge of the RDS signal with a predetermined edge of a signal delivered by the oscillator.

10. An apparatus according to claim 9 wherein the synchronization stage comprises a first D-type flip-flop having a D-type input, a clock input, and a Q output and wherein the RDS signal is supplied to the D-type input, the signal delivered by the oscillator is supplied to the clock input and the synchronization stage being structured to deliver at the Q output the RDS signal that is synchronized with the signal delivered by the oscillator.

11. An apparatus according to claim 10 wherein the temporary storage circuit comprises a third D-type flip-flop and a fourth D-type flip-flop, each having a D-type input, a clock input, and a Q output, the D-type inputs each being connected to the output of the programmable frequency divider, the clock inputs of the third and fourth D-type flip-flops being connected to the Q output of the first D-type flip-flop and to an output of the delay circuit, respectively, and each of the Q outputs of the third and fourth D-type flip-flops being connected to a respective input of the comparator circuit.

12. An apparatus according to claim 8 wherein the edge detector comprises a second D-type flip-flop having a D-type input, a clock input, and a Q output, and wherein the edge detector is fed at the clock input with the PDS signal which is acted upon at the D-type input with a logic value that remains constant, the edge detector being structured to deliver the first detection control signal at the Q output, and wherein an input terminal of the delay circuit is coupled to the Q output of the first D-type flip-flop.

13. An apparatus according to claim 8 wherein the comparator circuit comprises an XOR logic circuit.

14. An apparatus according to claim 8 wherein the digital integrator comprises an upward/downward counter having an upward/downward counting control input which is connected to the output of the comparator circuit and which delivers the first integrator output signal when a maximum count value is reached in the upward/downward counter and delivers the second integrator output signal when a minimum count value is reached in the upward/downward counter.

15. An apparatus according to claim 14 wherein various count values of the upward/downward counter can be selected for the maximum count value and the minimum count value.

16. An apparatus according to claim 15 wherein a selection of the maximum count value and a selection of the minimum count value are controllable as a function of a selection circuit such that, upon a switching over to a new transmitter receiving frequency, the switching over is possible to a maximum or a minimum count value having a lesser distance from an average count value, and upon an expiration of a predetermined period of time after the switching over or upon a determination of a latching of the receiver to the new transmitter receiving frequency, switching over is possible to a maximum count value or a minimum count value having a larger distance from an average count value.

* * * * *